Figure 1:
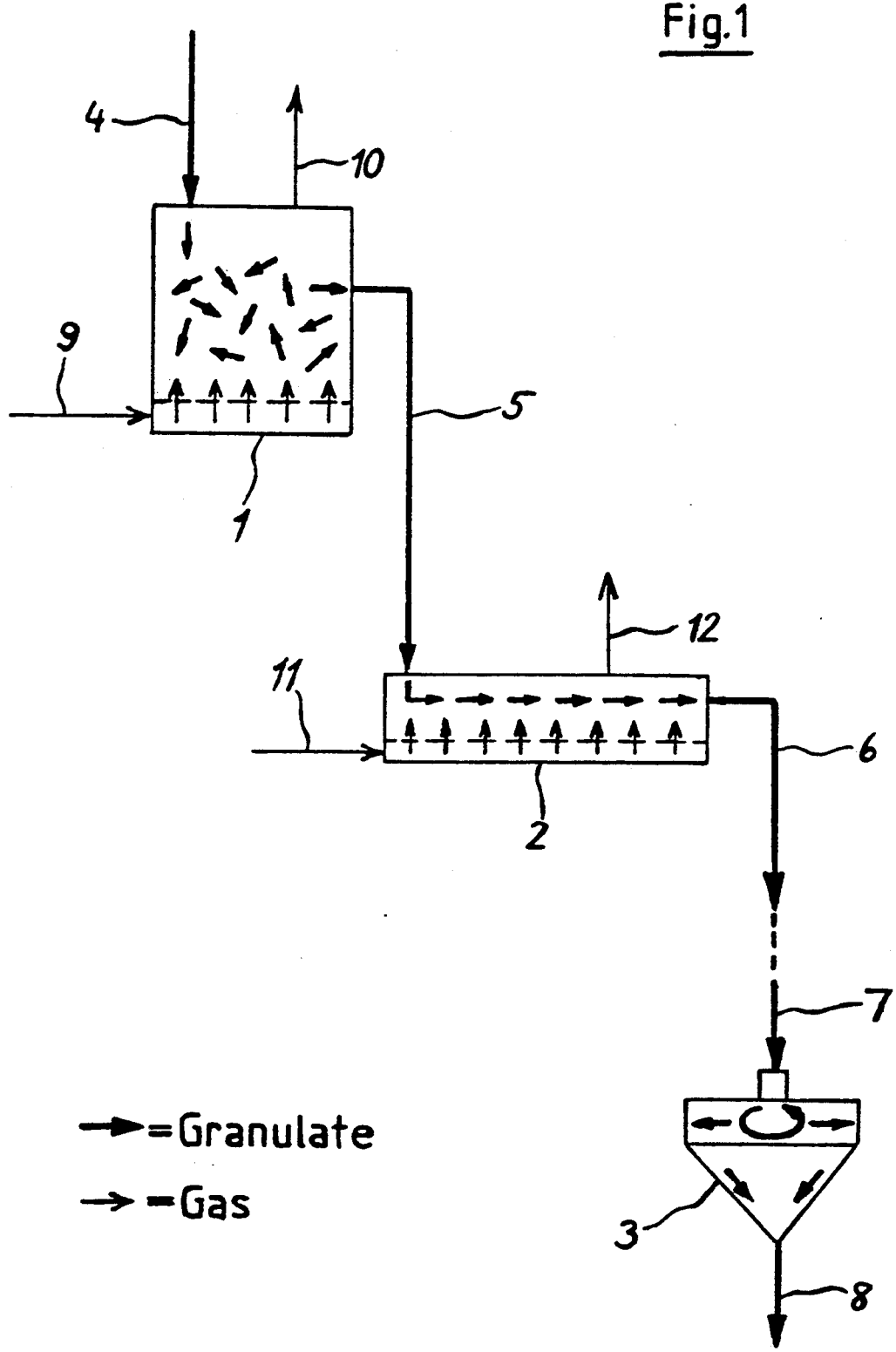

United States Patent [19]
Rüssemeyer et al.

[11] Patent Number: 5,090,134
[45] Date of Patent: Feb. 25, 1992

[54] METHOD AND APPARATUS FOR CONTINUOUSLY CRYSTALLIZING POLYESTER MATERIAL

[75] Inventors: Hans Rüssemeyer, Schwülper OT Walle; Manfred Kerl; Hans-Joachim Schmidt, both of Braunschweig, all of Fed. Rep. of Germany; Beat Häni, Zuzwil; Werner Kägi, Niederuzwil, both of Switzerland

[73] Assignees: Bühler AG, Uzwil, Switzerland; Bühler GmbH, Braunschweig, Fed. Rep. of Germany

[21] Appl. No.: 456,107

[22] Filed: Dec. 22, 1989

[30] Foreign Application Priority Data

Dec. 23, 1988 [CH] Switzerland ............ 04796/88

[51] Int. Cl.$^5$ ............................................ F26B 17/00
[52] U.S. Cl. ................................. 34/57 R; 34/57 A; 34/57 B
[58] Field of Search ............ 34/57 A, 57 R, 10, 57 B; 432/58

[56] References Cited

U.S. PATENT DOCUMENTS

| 4,161,578 | 7/1979 | Herron | 528/272 |
| 4,223,128 | 9/1980 | Halek et al. | 528/481 |

FOREIGN PATENT DOCUMENTS

| 2124203 | 11/1972 | Fed. Rep. of Germany | 34/57 R |
| 2140265 | 4/1976 | Fed. Rep. of Germany | 34/57 R |
| 2558730 | 1/1980 | Fed. Rep. of Germany | 34/57 R |
| 3213025 | 10/1983 | Fed. Rep. of Germany | 34/57 R |

Primary Examiner—Henry A. Bennet
Attorney, Agent, or Firm—Martin A. Farber

[57] ABSTRACT

Polyester granulates, in particular slowly crystallizing adhesive copolyesters are crystallized in two fluidized beds (1, 2) arranged in series and are guided into an impact apparatus (3) for the subsequent comminution of the small agglomerates. The first fluidized bed (1) is an effervescent fluidized layer with mixing characteristic and the second fluidized bed (2) is a flow bed with a plug flow characteristic. The second fluidized bed (2) ensures an adequate treatment duration in order to crystallize the amorphous grains of granulate which remain after the first fluidized bed (1).

24 Claims, 4 Drawing Sheets

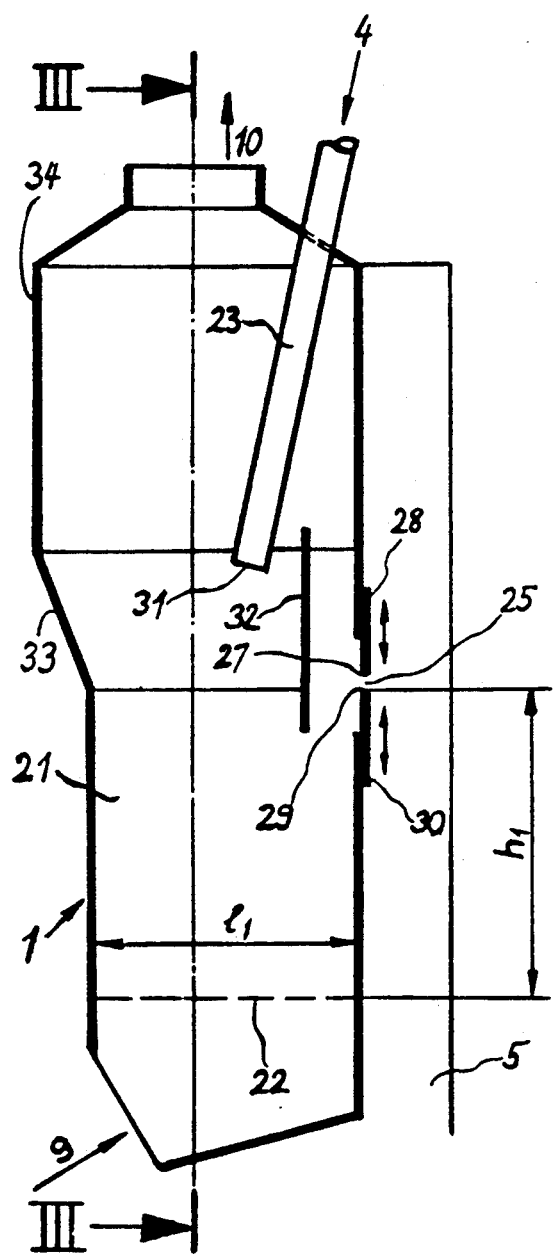
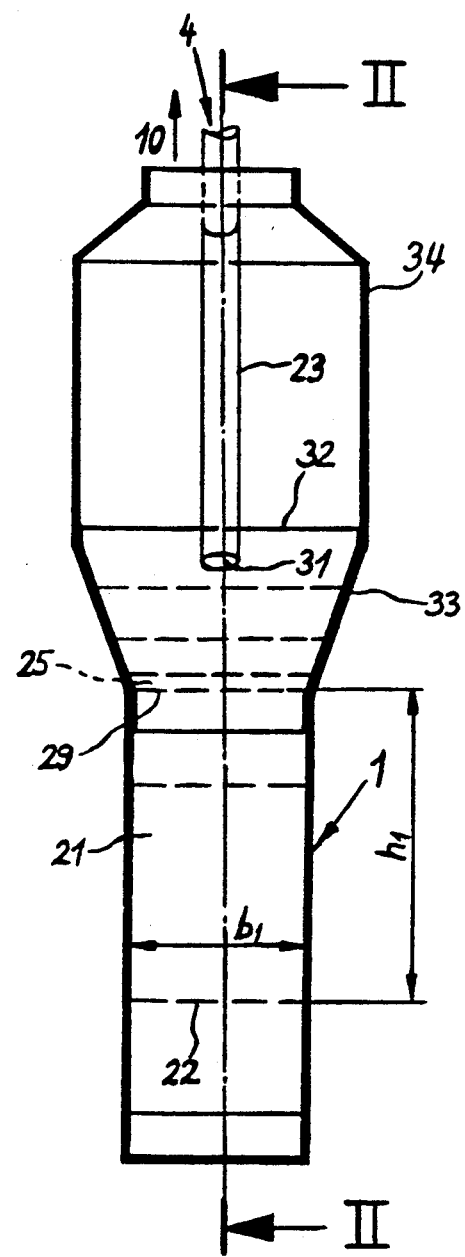
Fig. 2
Fig. 3

METHOD AND APPARATUS FOR CONTINUOUSLY CRYSTALLIZING POLYESTER MATERIAL

The invention relates to a method for the continuous crystallization of polyester material such as granulate or coarse powder, in particular copolyester granulate on the basis of polyethylene terephthalate, and also an apparatus suitable for carrying out the method.

Linear thermoplastic polyesters, primarily polyethylene terephthalate, have attained substantial significance and found many uses as a result of their good physical characteristics. The predominant proportion of such polyesters are processed into textile fibers and filaments. Furthermore, foils are manufactured from these materials as substrates or packaging materials and moreover injection molded articles are made from them. A growing market lies in the use of high molecular polyethylene terephthalate for bottles of containers in the foodstuff industry, in particular for carbonated drinks (drinks containing carbonic acid).

Specific characteristics of the polyester material are required depending on the purpose for which they are to be used. Certain characteristics can already be intentionally modified in the recipe for the polyester by diol-Cocomponents and/or dicarboxilic acid-Cocomponents and also by additives. Other characteristics such as high molecular weight (high intrinsic viscosity) and high purity (low acetaldehyde content for the foodstuff field) can only be achieved by an after-treatment or follow up treatment in the solid phase. In many cases the polyester production and the further processing into the finished article are carried out separately so that one produces a granulate as an intermediate stage which, because of the low speed of crystallization and the rapid cooling occurs in a amorphous form. During granulation and storage the granulate absorbs moisture. As any water which is present leads to corresponding hydrolysis of the polyester during later remelting the granulate must first be dried to a very low water content. At temperatures above 100° C. the amorphous polyester granulates have a strong tendency to stick together. At the same time with crystallizing polyesters crystallization sets in; however, it is only partial as with all macromolecules (end value for polyethylene terephthalate ca. 45% under normal conditions). In order that the granulate no longer sticks together and remains pourable in the subsequent thermal treatment stages (irrespective of whether these comprise drying or solid phase post condensation) it must, in accordance with Whitehead in "Industrial Engineering Chemistry, Process Design Development, Vol. 16, No. 3, 1977, pages 341-346" have a minimum density of 1.3 g/cm$^3$ in the case of polyethylene terephthalate (corresponding to a degree of crystallization of 31%). Other authors, for example in DE-OS 2 140 265, cite somewhat lower values.

The difficulty with the crystallization lies in preventing the formation of agglomerates and caking on in the crystallization apparatus during the critical sticky phase. The Van-der Waals' forces which are active at the boundaries of the granulate are responsible for the stickiness. These forces are saturated by crystallization. In the passive state crystalline regions (spherulitic) can however also grow over from one polymer particle to the other at the points of contact during the course of crystallization which can lead to irreversible connections. Accordingly, to prevent the grains of granulate from sticking together the grains are kept in continuous motion in many crystallization processes in order to reseparate the points of contact before the expiry of the critical contact time, so that the particle spanning crystal growth process is already interrupted in the initial stage and no permanent bonds can form. These processes include crystallization in a tumbling mixer. This process is however very complicated and expensive from the point of view of the apparatus and also complicated and expensive to use as a result of the batch operation. Continuous crystallization in a stirred bulk is also wide-spread. The corresponding containers have stirring elements which move the granulate essentially transverse to the direction of flow. Such crystallizers are known both as horizontal apparatus (for example U.S. patent Ser. No. 4 223 128 and U.S. patent Ser. No. 4 161 578) and also as the vertical upper part of shaft reactors (for example DE-OS 32 13 025). Through the forced movement of the stirrer uncontrolled high mechanical loadings with the formation of abraded material or deformation in the plastic state can however occur in the granulate. Material can cake onto the stirring element itself and with contact heating via the wall the problem additionally arises of the excess temperature in the marginal zone.

A fluidized layer operates without inbuilt mechanical elements. A fluidized bed apparatus has a larger specific volume and requires the guidance of the process gas (air) in a circuit for energetic reasons. The main disadvantage of a customary fluidized layer, for example in accordance with DE-OS 1 467 213 with continuous operation lies however in the broad dwell time spectrum which results in a scatter of the degree of crystallization and of the simultaneously occurring predrying. Fluidized beds with a more homogeneous dwell time spectrum, for example DE-AS 20 53 876, have however a relatively small throughput and a low degree of thermal efficiency.

As a consequence of the above disadvantages crystallization methods were developed which no longer attempt to avoid the sticking together of the granulate but rather intentionally allowed the granulate column to stick together in a shaft apparatus (DE-AS 25 58 730 and DE-OS 26 42 102). In this way one obtains a uniform dwell time and the granulate does not have to be mechanically loaded during the crystallization. The intention is to convert the block of agglomerate into a pourable or flowable granulate again by paring it away from the lower side layerwise. Because of the temperature regulation which is difficult to control (because of the exothermal heat of crystallization), with non-precisely adjustable thicknesses of the stuck together portions, such pronounced agglomerations could however arise that the mechanical paring was no longer possible. In normal operation disturbing dust arose through the comminution of the agglomerate.

Having regard to the difficulties during crystallization it had also been proposed as a substitute to cover the granulate surface with a fine powder to suppress the tendency to stick together. This method has however the disadvantage that the polyester subsequently contains an additional substance (not usable for flask granulate) or the additive must also be quantitatively removed after the temperature treatment (for example U.S. patent Ser. No. 4 130 551). Moreover, an apparatus is necessary for the addition of the powder. The method would at most be usable with titanium dioxide for poorly crystallizing copolyesters which would in any case be made mat (see DE-OS 2 124 203).

An improved method of crystallization is described in the Swiss patent specification 665 473. Here an effervescent fluidized layer is used on which a plug flow is superimposed through a special design so that a narrow dwell time distribution results and so that the mean residence time can be kept short. The method and apparatus are a good economic solution for polyethylene terephthalate. This apparatus is however not suitable for very slowly crystallizing copolyester which thereby has a longer sticky phase since agglomerate lumps can form despite the fluidized movement.

Especially for the manufacture of flasks use is nowadays often no longer made of pure polyethylene terephthalate, but instead the PET is modified with Co-components. Any diols or dicarboxilic acids (or corresponding diesters) can be considered as Co-components through which the ethylene glycol and/or the terephthalic acid can be partially replaced. For flask granulate use is for example made of cyclohexane-1,4-dimethylol or isophthalic acid in the range from 0-5 mol-% (related to the diol or dicarbolic acid quantities). Copolymers have a lower melting point when compared with homopolymers. This brings the advantage with flask manufacture that lower process temperatures are possible (by ca. 5° C.) whereby during injection casting of the preforms the formation of acetaldehyde by thermal decomposition reactions is once again reduced. The second advantage of the single condensing Co-components lies in the prevention of the crystallization which results in glass-clear (100% amorphous) preforms and flasks. (With pure PET light opacity sometimes arises despite rapid cooling). The latter circumstance naturally signifies that the copolyester granulate shows an extremely sticky behaviour during crystallization. A material of this kind could not be crystallized without problems with the previous methods in accordance with the prior art. Very sticky granulate could admittedly theoretically also crystallize without movement and without the formation of agglomeration if measures were taken to ensure that no grain of granulate contacted another grain. Such single grain treatment would however signify huge pieces of apparatus of low productivity so that this possibility cannot be considered for economic reasons.

The invention is based on the object of carrying out the crystallization of polyesters which tend to stick together strongly in a continuous cost favourable process with corresponding apparatus in a reliable manner which is kind to the material and produces a uniform end quality. Polyesters will be understood to mean here all polymers built up of diol and dicarboxilic acid components. So far as the diols are concerned these are above all alkylene glycols such as ethylene glycol, 1,3-propylene glycol or 1,4 butylene glycol and also cycloalkane diols such as cyclohexane 1,4-diol or cyclohexane 1,4-dimethylol. The dicarboxilic acids are primarily terephthalic or isophthalic acid, naphthaline dicarboxilic acids and also adipic acids, sebacic acids etc. Naturally mixtures of these and also small proportions of multi-functional alcohols and carboxilic acids can also be considered as well as organic or inorganic additions up to approximately 20% by weight. The most important polyester types are however polyethylene terephthalate and the copolyesters which are based thereon. The grain geometry can extend from coarse powder up to different granulate shapes.

The invention is characterized in that the polyester material is guided through two fluidized beds arranged in series of which the first is an effervescent fluidized layer with a mixing characteristic and the second is a flow bed with a plug flow characteristic. After the second fluidized bed the remaining small agglomerates can be subsequently comminuted in an impact device independent from and separate from the crystallization.

The fact that this procedure makes it possible to achieve troublefree crystallization of sticky polyesters and at the end delivers an agglomerate-free granulate with a uniform degree of crystallinity is surprising and was not predictable. A broadening of the dwell time distribution such as arises through the effervescent bed was previously considered unavoidable with a homogeneous end product. Moreover, it was hitherto only possible to crystallize very sticky copolyesters with mechanical stirring (with the disadvantages described above). Also unexpected is the fact that the cohesive force of the small agglomerates which arise under the conditions of the invention is so small that these agglomerates can be broken down into individual grains with a moderate expenditure of force following the crystallization, whereas, in the conventional methods it is necessary to interfere directly during the sticky phase and crystallization phase under uncontrollable conditions in order to prevent irreversible sticking together Advantageous layouts of the method of the invention relate to the temperatures of the granulate and of the treatment gas, to the gas throughput and the gas speed in the fluidized beds, furthermore to the mass conditions of the fluidized beds. They also relate to the impact process for the subsequent comminution of the granulate.

The apparatus for carrying out the method is characterised in that there is inserted after a first fluidized bed with a mixing characteristic a second fluidized bed with a plug flow characteristic. Advantageous developments of the apparatus of the invention relate to the containers for the fluidized beds, their mass conditions, their discharge devices and also the impact apparatus.

Figure 4:
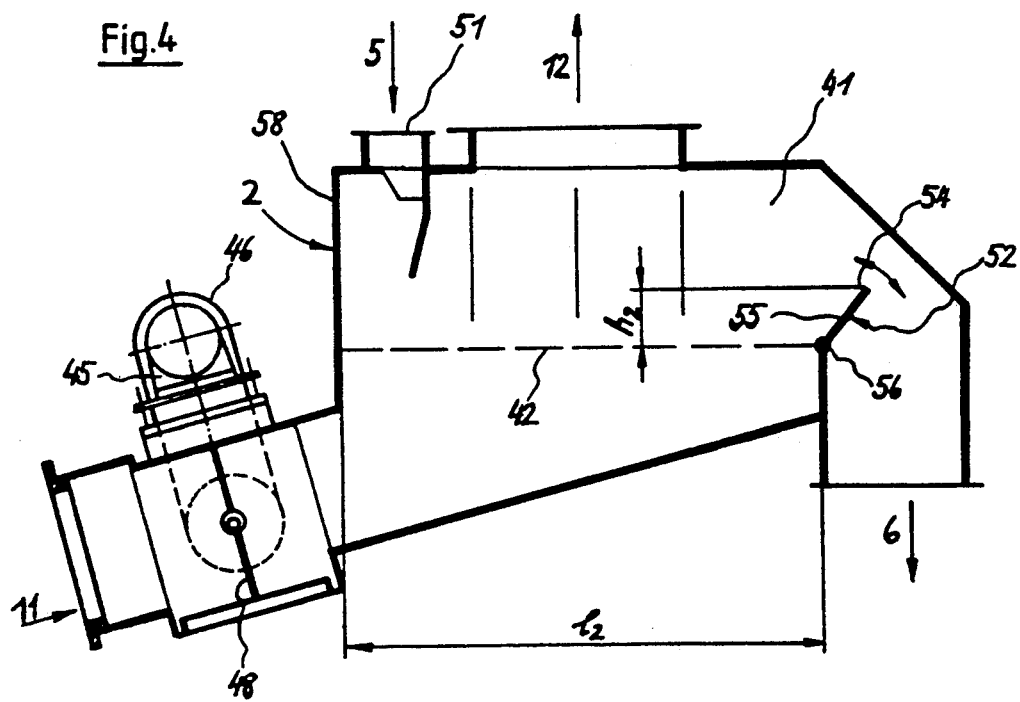
Figure 5:
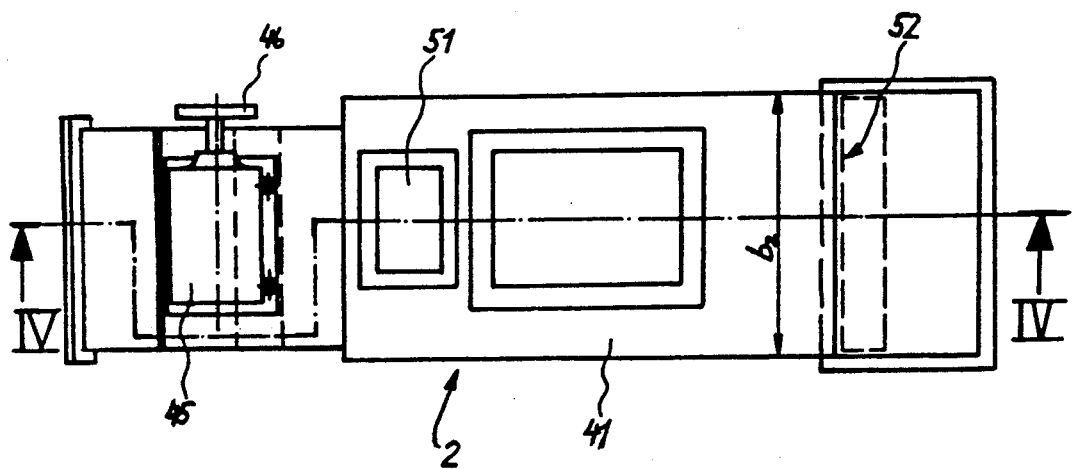
Figure 6:
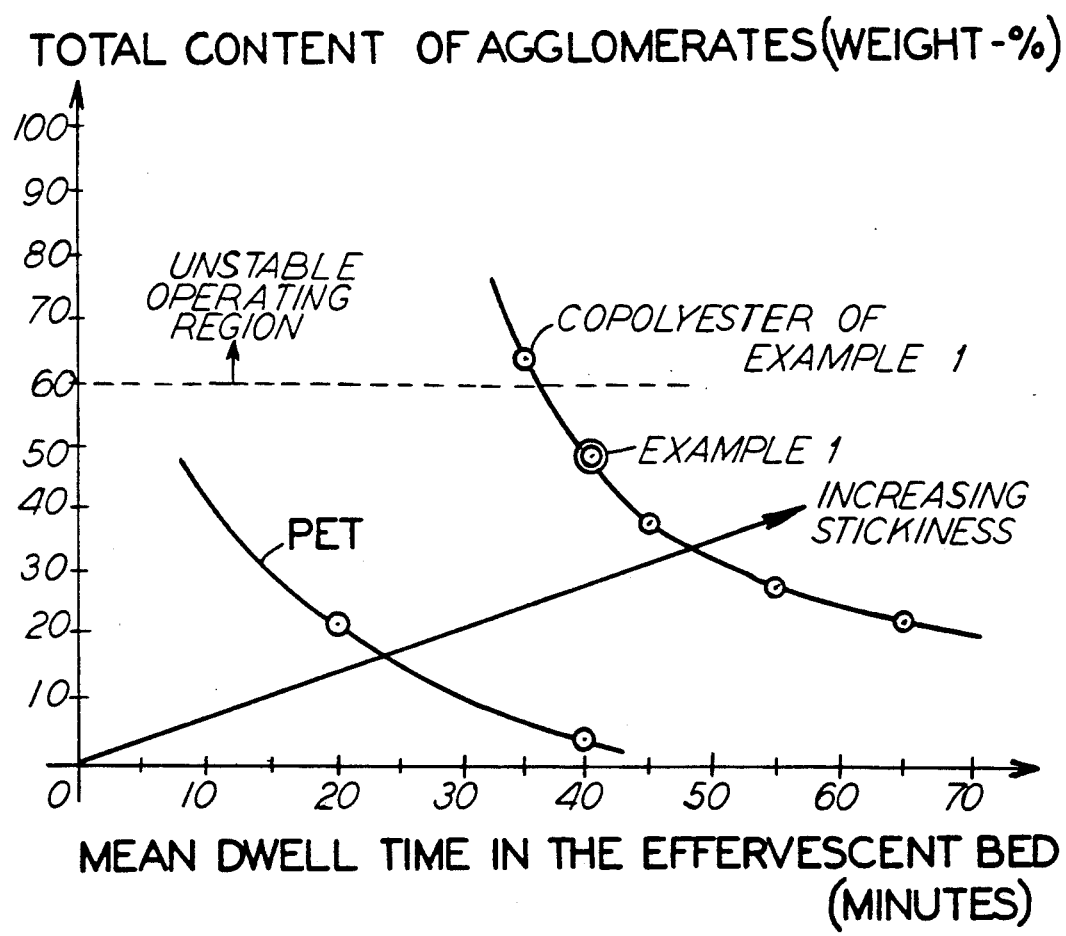

The invention will now be explained in the following with reference to an embodiment which is illustrated in the drawings which show:

FIG. 1: a flow scheme for the method of the invention and of the apparatus in order to represent the series arrangement of apparatus and the granulate movement, FIG. 2: a vertical section through an embodiment of the first fluidized bed of the apparatus of the invention along the line II—II in FIG. 3, FIG. 3: a section along the line III—III of FIG. 2, FIG. 4: a vertical section through an embodiment of the second fluidized bed of the apparatus of the invention along the line IV—IV of FIG. 5, FIG. 5: a plan view of the fluidized bed of FIG. 4, FIG. 6: a diagram which shows the agglomerate fraction as a function of the mean dwell time in the first fluidized bed.

FIG. 1 shows the effervescent bed as a first fluidized bed 1, the flow bed as a second fluidized bed 2 and the impact apparatus 3. The entering amorphous flow of granulate 4 is heated and precrystallized in the effervescent bed 1 with intensive movement and mixing with already present crystalline material. Heated air or an inert gas, for example nitrogen, is used as the fluidization gas which simultaneously acts as the heat transfer medium. The exhaust gas 10 is normally guided in a circuit (with dust separation) back to the inlet 9 for energetic reasons. The inlet temperature of the gas is so adjusted that a mean granulate temperature of 140° to 180° C., preferably of ca. 160° C. results. The corresponding gas inlet temperature amounts to 150° to 190° C., preferably to 170° to 175° C. The specific gas throughput for forming an intensively moving effervescent layer amounts to 3 to 30 $m^3_n$ per kg of granulate throughput (normal cubic meter related to 0° C. and 1 atmosphere = 760 Torr), in particular 5 to 20 $m_n^3$. One endeavours to obtain through-mixing as in an ideally stirred vessel. The mean dwell time to be selected in the effervescent bed 1 depends on the tendency of the material to stick together and lies between ca. 5 minutes for a well behaved PET and ca. 60 minutes or more for a sticky copolyester (the mean dwell time is simultaneously the hold-up of the fluidized bed divided by the granulate throughput). The granulate flow 5 emerging from the effervescent bed 1 passes into the flow bed 2 in which a fluidization also takes place, however only so weakly that practically no mixing takes place and the material displaces itself in plug flow-like manner with a slight movement. In this way it is ensured that the still amorphous grains of granulate (recognisable from the transparency) of the flow 5 amounting to approximately 2 to 5%, typically 3 to 4%, have a minimum dwell time of ca. 2 to 25 minutes in the fluidized bed 2 in order attain the crystalline state (i.e. the partly crystalline end value). The temperature of the hot gas 11 which is supplied lies at 0° to 20° C., preferably ca. 10° C. above that of the flow 9. The material is warmed in the flow bed 2 once again by 10° to 30° C., preferably to approximately 180° C. The specific gas throughput amounts to 1,5–15 $m_n^3$ per kg of granulate throughput. The exhaust gas 12 is normally also returned again in a circuit. Because of the stagewise progress of the heating and crystallization and the guarantee of a corresponding minimum dwell time the granulate of the emergent flow 6 has, despite the wide spread of the dwell time spectrum through the effervescent bed 1, such a uniform degree of crystallinity as could only be previously achieved by batch crystallizers or continuous apparatuses with very narrow dwell time distribution. When compared with customary apparatus the combination of an effervescent bed and a flow bed has however the advantage in accordance with the invention that, despite doing away with mechanical stirrers, even extremely sticky copolyesters can be uniformly crystallized under stable stationary conditions without caking, and that the proportion and the size of the agglomerates can be kept within such limits that the product 6 is still freely flowing and pourable. The latter circumstance means that it is not necessary to comminute these agglomerates directly after the crystallization, but rather that drying or drying and solid phase post condensation can first be carried out without disadvantages, as is indicated by the chain-dotted part of the line 6, 7.

Bridge formation does not occur with the small size of the agglomerates (largely pairs of grains of granulate, residual groups of three grains of granulate and some groups of four) and the agglomerates which have arisen in accordance with the invention do not have a slowing effect on the drying or post condensation speed, since these agglomerates as a rule are not stuck together face to face, but rather via an edge, so that the surface is practically not reduced in size. The latter is also the reason for the relatively low mechanical strength of the described agglomerates. In other respects it has been shown that the agglomerates arise almost exclusively in the effervescent bed 1 and that the proportion and size distribution do not undergo any significant change in the flow bed 2. As even under gentle conditions the comminution of the agglomerate also gives rise to a small quantity of broken pieces and dust it is of advantage with solid phase post condensation to first carry out the follow-up comminution (and eventual wind swifting) at a later stage as fine components always condense more rapidly (inhomogeneous end product) and are moreover more inclined to sticking. With pure drying with a directly following extruder it is not necessary to carry out a post comminution step, i.e. a subsequent comminution step, although this would also be possible in the hot state, since no intake disturbances need be feared with the extruder. With a solid phase post or after condensation one advantageously arranges the impact apparatus 3 after the granulate cooler. In this case the flow 7 which enters into the impact apparatus would still correspond to the flow 6 as seen from the point of view of the agglomerates but would have a higher molecular weight and a lower temperature. For the splitting up of the small agglomerates which arise in accordance with the invention it is sufficient to use impact speeds in the order of magnitude of 10 to 50 m/sec, preferably 20 to 35 m/sec. The splitting up of the agglomerates can in principle take place with any apparatus in which these speeds occur (for example also pneumatically). It is however advantageous to use an impactor in which the granulate containing agglomerate is spun from a rotor at a defined peripheral speed onto impact surfaces (impact plates or impact ring). By varying the speed of rotation the minimum impact speed can be precisely determined which is necessary in order to break up all agglomerate, and thus it is possible to convert the product gently under precisely controlled physical conditions into a troublefree single grain granulate (end product flow 8). Companies which process the granulate further require as a quality feature an agglomerate concentration in the granulate of less than 0.1% by weight. This value can be achieved with the apparatus of the invention without sieving out agglomerates, providing agglomerates are not already present in the amorphous starting granulate which are generally more strongly fused together and can no longer be separated by means of impaction.

The first fluidized bed shown in FIGS. 2 and 3, i.e. the effervescent bed 1 has a container 21 which is provided with an apertured base 22 at the bottom to which the flow 9 of the treatment gas is supplied. The exhaust gas 10 escapes upwardly and is mostly returned in a circuit.

The granulate flow 4 passes through a drop tube 23 into the container 21. The flow 5 of the treated granulate emerges out of the container 21 through a discharge gap 25, the upper edge 27 of which is formed by a vertically adjustable plate 28 and a lower edge 29 of which is formed by a vertically adjustable plate 30. Thus the vertical position and width of the discharge gap 25 are adjustable and/or regulatable. Between the supply point formed by the outlet 31 of the drop tube 23 and the discharge gap 25 there is arranged a vertical partition wall 32 in order to avoid grains of granulate springing directly from the supply point to the discharge gap 25. For flow reasons the partition wall 32 can consist partially or wholly of apertured sheet metal.

At approximately the level of the discharge gap 25 the container 21 broadens into a transition part 33 which leads to the upper part 34. Thus the speed of the treatment gas reduces so that grains taken along with it fall back into the fluidized layer.

The active part of the fluidized bed in the container 21 has a length $l_1$ which is measured in the direction of the horizontal component of the path between the supply point 31 and the discharge gap 25. Its height $h_1$ is measured between the apertured base 22 and the lower edge 29 of the discharge gap 25.

In order to ensure a reliable and rapid mixing of the granulate in the fluidized bed one selects the coefficient $K_1 = l_1/h_1$ to lie from 0.5 to 1.5. The width $b_1$ is less critical should however not be made too small.

In a test installation 11 was selected equal to $h_1$ equal to 0.6 m. Thus $K_1$ was equal to 1. For another test $l_1$ was selected to be 0.6 m and $h_1$ equal to 0.9 m. Thus the coefficient $K_1$ was equal to 0.66. Here the width $b_1$ was equal to 0.5 m, i.e. twice as large as in the example of the first test plant. With even larger apparatus $l_1$ will increase much more rapidly than $h_1$ so that a coefficient of approximately $K_1 = 2$ will be achieved.

It is advantageous to provide the surfaces of the container 21 which come into contact with the polyester material with a surface treatment in order to avoid caking. This effect can be achieved either by a PTFE polytetrafluoroethylene coating or by bead blasting of the inner surface. PTFE has the lowest surface energy of all materials and thus nothing sticks. With bead blasting a structured surface arises with projecting points and edges with the formation of small craters which greatly reduces the contact surface.

The fluidized bed 1 is sold by the company Bühler/Bühler-Miag under the designation OTWK.

The second fluidized bed shown in FIGS. 4, 5, i.e. the flow bed 2 has a channel-like container 41 which is provided at the bottom with an apertured base 42 to which the flow 11 of the treatment gas is supplied. The exhaust gas 12 escapes at the top and is mainly guided in the circuit.

The flow 11 of the treatment gas is directed via a rotating flap 48 which is driven by a motor 45 and the belt drive 46 and which generates a gas pulsation. As shown in DE-PS 21 01 143 the flap 48 can be multiply provided so that various parts of the apertured base 42 are subjected to temporally displaced gas pulsations.

The flow of granulate 5 passes via an inlet 51 into the container 41. The flow 6 of the treated granulate emerges from the container 41 via a weir 52, the upper edge 54 of which is formed by an inclined adjustable plate 55 which is pivotable by means of a hinge about the horizontal axis 56. Thus the vertical position of the weir 52 is adjustable and/or regulatable.

The active part of the fluidized bed in the container 41 has a length $l_2$ which is measured between the wall 58 which adjoins the entry 43 and the weir 45. The height $h_2$ is measured between the apertured base 42 and the upper edge of the weir 45.

One advantageously selects the coefficient $K_2 = l_2/h_2$ from 2.5 to 10, preferably 4 to 8. For an industrial plant one can select $l_2 = 0.95$ m and $h_2 = 0.2$ m. Thus the coefficient $K_2 = 4.75$ with a width $b_3 = 0.3$ m.

An embodiment of the fluidized bed 2 has been sold for years by the companies Bühler/Bühler-Miag under the designation OTW (mark PULSEBED). This fluidized bed is described in detail in U.S. patent Ser. No. 3 691 644, the content of which is incorporated fully herein by way of reference.

For the crystallisation one could also imagine a combined apparatus which contains both an effervescent bed and also a flow bed and eventually makes do with only one gas circuit.

The impactor type SBC of the companies Bühler/Bühler-Miag is suitable as an impact apparatus 3. This impactor is described in detail in U.S. patent Ser. No. 4 341 152, the content of which is incorporated fully herein by way of reference.

EXAMPLE 1

An edged strand granulate with the dimensions $2 \times 2 \times 3$ mm was used as the amorphous starting material. From the point of view of its composition this was a copolyester consisting of terephthalic acid and the two diol components ethylene glycol and cyclohexane-1,4-dimethylol in the molecular ratio 96.5:3.5. The intrinsic viscosity amounted to 0.57 dl/g measured in a solvent mixture of phenol and 1,1,2,2-tetrachloroethane in the ratio of 60:40 weight percent. This material showed a very sticky behaviour during crystallization. It was dispensed in a pilot plant into an effervescent reactor 1 with a throughput of 60 kg/h. The mean dwell time therein amounted to 40 minutes. The hot supply air had a temperature of 170° C. and an incident flow speed of 3.1 m/sec. This incident flow speed relates to the whole area of the apertured base 21 because the air distributes itself almost directly above this apertured base 21 over the whole horizontal cross-section (base area) of the fluidized bed 1. The specific air consumption amounted to 12.3 $m_n^3$ per kg granulate throughput. The mean granulate temperature amounted to 160° C. at which the product flow was fed into an OTW (mark PULSBED) as the fluidized bed 2. There the granulate was treated with supply air at 180° C. at a mean (pulsing) outflow speed of 1.2 m/sec for 15 minutes. The finished crystallized product was finally allowed to flow at a temperature of ca. 100° C. through an impactor 3 where the agglomerate broke into problemfree individual granulates at a rotor peripheral speed of 25 m/sec. The entire process, in particular in the effervescent bed 1, took place absolutely stably during the whole test phase without disturbances due to caking on or the formation of lumps. The small agglomerates were hardly recognisable in the process from the optical viewpoint. The content of agglomerates (sorted out without the exertion of force) and also their size distribution were as follows (table 1) at the various points of the process (see FIG. 1):

TABLE 1

| Agglomerate (proportion in weight %) | amorphous starting granulate (4) | after the effervescent bed (5) | after the flow bed (6) | prior to the impactor (7) | after the impactor (8) |
|---|---|---|---|---|---|
| Total proportion thereof | 4.3 | 51.4 | 49.3 | 38.5 | 3.2 |
| pairs thereof | 100 | 68.5 | 64.9 | 83.1 | 100 |
| groups of three | — | 21.3 | 24.0 | 13.2 | — |
| groups of four or more | — | 10.2 | 11.1 | 3.7 | — |

One sees that the agglomerates arise in the effervescent bed 1. They are however so weak that they already at least partially fall apart on transport to the impactor 3. The density was measured as a measure for the degree of crystallinity. For the conversion the following formula was used:

$$K = \frac{\rho_c}{\rho} \cdot \frac{\rho - \rho_a}{\rho_c - \rho_a}$$

K = the weight related crystalline proportion
ρ = the measured mean polymer density of a grain of granulate
$\rho_a$ = the density of fully amorphous polymer
$\rho_c$ = the density of 100% crystalline polymer (theoretical value calculated from the dimensions of an elementary crystalline cell).

For the boundary values of PET (at 20° C.) there apply, in accordance with J. Brandrup E.H. Immergut: Polymer Handbook, 2nd Edition 1975, Wiley-Interscience $= 1.335$ g/cm$^3$
$= 1.455$ g/cm$^3$.

In order to freeze the instantaneous state the samples for the density measurement were immediately quenched in cold water. After the effervescent bed 1 the density distribution was, as expected, broad, i.e. it extended from 1.325 (ca. 3.5% still transparent, amorphous granulate grains) to 1.365 (crystalline main component). The grains of granulate after the OTW fluidized bed 2 (mark PULSBED) have however a surprisingly in the narrow distribution and indeed practically a uniform value of 1.365±0.001 g/cm$^3$ (limits of the extreme values for 100 representative grains). This value corresponds to a ca. 33% degree of crystallinity if one can assume that $\rho_a$ for the present copolyester amounts to ca. 1.325.

Any objections that the granulate could eventually be damaged by oxidation because of the partly long dwell times in the hot air were refuted by colour measurements. In the customary colour measuring system L*a*b* the b* values of all samples taken after even after several hours lay slightly in the negative region (ca. −0.7) which signifies that instead of a yellow tint (positive b* values) which point to damage there is if anything a tendency to a light blue shade.

FURTHER EXAMPLES

In further test variants the influence of the mean dwell time in the effervescent bed 1 on the agglomerate formation was investigated with the other adjustments remaining the same. The dependence shown in FIG. 6 resulted. When the dwell time is too short so much agglomerate (over 60%) arose that the effervescent bed 1 no longer attained a stable state and "tipped over" through increasing stickiness which could in each case be seen shortly before the collapse from the reducing fluctuation width of the pressure drop over the effervescent bed 1. Below the critical limit the agglomerate proportion reduced with increasing dwell time. In order not to make the effervescent bed 1 larger than necessary a dwell time is advantageously selected which is not too far away from the critical limit, as was the case in example 1. For the comparison a normal PET (homopolymer) was also used which made it possible to estimate how much stickier the copolyester was.

In the first fluidized bed 1 a specific gas throughput of 5 to 20 m$_n^3$ was selected in particular 12 m$_n^3$ per kg of granulate throughput. The incident flow speed amounted to 2 to 6 m/sec, preferably 2.5-3.5 m/sec, in particular 3 m/sec.

In the second fluidized bed 2 a specific gas throughput of 2-8 m$_n^3$, in particular 4 m$_n^3$ per kg of granulate throughput was selected the incident flow speed amounted to 0.8-3 m/sec, preferably 1-1.5 m/sec, in particular 1.2 m/sec.

We claim:
1. An apparatus for continuously crystallizing particulate polyester material, the apparatus comprising:
   a first fluidized bed to impart a first end temperature to said particulate material, said first fluidized bed having a first predetermined length and including first barrage means of a first height to ensure a layer of fluidized material at said first height, the first length being in proportion to said first height and giving a first coefficient, said first fluidized bed being formed as a whirling bed including a first zone of high gas energy of flow for conveying said particulate material upwardly, and a downwardly inclined surface providing a second zone of reduced gas energy of flow to enable said material to whirl downwardly, so as to provide a mixing characteristic of said first fluidized bed; and
   a second fluidized bed to impart a second end temperature to said material;
   each fluidized bed having an input and an output for said material;
   said second fluidized bed having a second predetermined length and including second barrage means of a second height to ensure a layer of fluidized material at said second height, there being a second length in proportion to said second height in said second fluidized bed giving a second coefficient, said second fluidized bed having a plug flow characteristic wherein said particulate material forms a fluidized layer which moves substantially uniformly from its input to its output.
2. Apparatus as claimed in claim 1, wherein: said first coefficient is in a range of 0.5 to 2.
3. Apparatus as claimed in claim 2, wherein: said first coefficient is approximately 1.
4. Apparatus as claimed in claim 1, wherein: said first fluidized bed comprises vessel means provided with said first barrage means, said barrage means comprising at least one vertically adjustable plate for adjustment of said first height, the output of said first fluidized bed being formed by a slit-shaped opening above said plate.
5. Apparatus as claimed in claim 4, wherein: said output of said first fluidized bed comprises an upper plate above said vertically adjustable plate, said upper plate being also vertically adjustable for varying the height of said slit-shaped opening.
6. Apparatus as claimed in claim 1, further comprising:
   vertical partition means for preventing said material from jumping from said inlet directly to said outlet.
7. Apparatus as claimed in claim 1, wherein: said first fluidized bed comprises wall means surrounding a working chamber and, thus, forming a vessel, said wall means having inner surfaces facing said chamber, said inner surfaces being treated by an anti-adhesive treatment.
8. Apparatus as claimed in claim 7, wherein: said inner surfaces are coated with a layer of polytetrafluoroethylene.
9. Apparatus as claimed in claim 7, wherein: said inner surfaces are pearl-blasted.
10. Apparatus as claimed in claim 1, wherein:

said second fluidized bed comprises wall means forming a channel-shaped vessel.

11. Apparatus as claimed in claim 1, wherein:
said second coefficient is in a range of 2.5 to 10.

12. Apparatus as claimed in claim 11, wherein:
said second coefficient is in a range of 4 to 8.

13. Apparatus as claimed in claim 12, wherein:
said second coefficient is approximately 5.

14. Apparatus as claimed in claim 1, wherein:
said second barrage means is adjustable in height.

15. Apparatus as claimed in claim 1, wherein:
the ratio of said second coefficient to said first coefficient is greater than 2.

16. Apparatus as claimed in claim 1, wherein:
the ratio of said second coefficient to said first coefficient is greater than 3.

17. Apparatus as claimed in claim 1, wherein:
gas pulsating means within at least one of said fluidized beds for providing a pulsating gas stream.

18. Apparatus as claimed in claim 17, wherein:
said gas pulsating means is located within said second fluidized bed.

19. Apparatus as claimed in claim 1, further comprising:
means forming a closed gas circuit for at least one of said fluidized beds.

20. Apparatus as claimed in claim 19, wherein:
said closed gas circuit is common to said first and second fluidized beds.

21. Apparatus as claimed in claim 1, wherein:
said polyester material is relatively slowly crystallizing sticky co-polyester, and said apparatus includes winnowing means in a path of said material through said second fluidized bed.

22. Apparatus as claimed in claim 1, further comprising:
a winnower disposed after said second fluidized bed.

23. Apparatus as claimed in claim 22, wherein:
said winnower is a rotary winnower.

24. Apparatus as claimed in claim 23, wherein:
said winnower is a centrifugal winnower.

* * * * *